United States Patent [19]

Wolters

[11] Patent Number: 4,711,012
[45] Date of Patent: Dec. 8, 1987

[54] APPARATUS AND METHOD FOR INSTALLING GUTTER DROPS ON RAIN GUTTERS

[75] Inventor: Donald R. Wolters, Phoenix City, Ala.

[73] Assignee: J & L Associates, Inc., Columbus, Ohio

[21] Appl. No.: 303,510

[22] Filed: Sep. 18, 1981

[51] Int. Cl.$^4$ .............................................. B23P 11/00
[52] U.S. Cl. ................................................. 29/243.52
[58] Field of Search ............... 29/243.5, 243.52, 283.5; 81/443, 446; 294/94; 72/393, 399

[56] References Cited

U.S. PATENT DOCUMENTS

| | | | |
|---|---|---|---|
| 705,724 | 7/1902 | Upson | 81/446 |
| 1,019,920 | 3/1912 | Saum | 81/446 |
| 4,220,034 | 9/1980 | Pagonowski | 72/399 |
| 4,334,703 | 6/1982 | Arthur et al. | 29/283.5 |

Primary Examiner—Robert C. Watson
Attorney, Agent, or Firm—Hughes & Cassidy

[57] ABSTRACT

An apparatus and method wherein a punching tool is used to punch a downspout hole in the bottom wall of a rain gutter, and wherein a swaging tool is insertable into a gutter drop after the gutter drop is inserted into the downspout hole to swage-lock the gutter drop to the rain gutter.

7 Claims, 14 Drawing Figures

APPARATUS AND METHOD FOR INSTALLING GUTTER DROPS ON RAIN GUTTERS

FIELD OF INVENTION

This invention generally relates to the connection of downspouts to rain gutters and is particularly concerned with a novel apparatus and method for installing gutter drops on rain gutters.

BACKGROUND

In rain gutter installations, gutter drops or mouthpieces, as they are also called, are used to provide connections between the rain gutters and downspouts. Prior to this invention, the gutter drops have typically been installed by first cutting a downspout hole in the gutter's bottom wall with hand snips, by inserting the gutter drop into the downspout hole, and by securing the inserted gutter drop to the gutter by rivets or other suitable fasteners.

The foregoing method of installing gutter drops has several disadvantages. First, it requires several tools and parts, including a pair of hand snips, a drill, a rivet tool, and the rivets themselves. Second, it requires time-consuming, skilled workmanship to make a neat, satisfactory installation. Third, the downspout holes usually are rough and do not fit closely with the gutter drop when they are cut with hand snips, chisels, hacksaws or other similar tools. Fourth, workmen can easily cut their hands on the rough edges of the downspout hole.

One proposal for simplifying the connection of a downspout to a rain gutter is described in U.S. Pat. No. 3,967,452 which issued to J. E. Maloney, Jr. et al. on July 6, 1976. In this patented proposal, a combination punching and cutter tool is used to cut the downspout hole in such a way that part of the gutter's bottom wall forms downwardly turned tabs. The tabs are received in and fastened to the upper end of the downspout to secure the downspout to the gutter.

Although the proposal described in the Maloney patent has the advantage of eliminating the need for a separate gutter drop or mouthpiece, it nevertheless has a number of drawbacks. First, the construction of the patentees' combination punching and cutting tool is relatively complicated and includes an intricate arrangement of blades which are required for cutting the downspout attachment tabs out of the gutter. Second, it is cumbersome to use for cutting holes in rain gutters which are already hung in place on a building structure. Third, it cannot be used for installation having an existing downspout hole. Fourth, an inconvenient set screw manipulation is required where it is desired to change the orientation of the downspout hole. The orientation adjustment is needed for using the same tool to make cuts where the long dimension or axis of the hole lies either parallel to or transversely of the gutter.

The present invention has none of the foregoing drawbacks and offers additional advantages as will become apparent from the following summary and detailed description.

SUMMARY AND OBJECT OF INVENTION

In accordance with this invention a rimmed or flanged gutter drop is installed by first punching a downspout hole in the gutter bottom wall and then by swaging the inserted gutter drop to lock it to the gutter's bottom wall. The swaging operation is such that the gutter drop is secured in place by gripping the gutter's bottom wall between the gutter drop's rim or flange and the swaged formations. To carry out the installation in a quick and easy manner, the present invention contemplates the provision of novel punching and swaging tools which are easy to use, and which are of simplified, rugged, compact construction.

In the punching tool of this invention, the punch is fixed on a guide shaft which, in turn, is mounted on a support structure for axial and rotational motion about a fixed axis. Coacting means are provided on the guide shaft and support structure to facilitate the selective rotational displacement of the shaft and punch assembly between angularly spaced apart operating positions and to further facilitate the rectilinear displacement of the shaft and punch assembly at each of its operating positions, whereby the punch is selectively displaceable to punch the downspout hole in cooperation with a female die. In the illustrated embodiment, the coacting means mentioned above comprises a pin on the support structure and a pin-receiving groove formation on the guide shaft. The groove formation allows axial displacement of the shaft and punch assembly only when the punch is in either one of its operating positions. These operating positions are spaced 90° apart to facilitate cuts in which the long dimension or long axis of the downspout hole lies either parallel to or transversely of the gutter.

The coacting pin and groove construction mentioned above accurately locates the punch in either one of its punch operating positions to assure a precise orientation of the punched hole in the gutter. The female die is positionable on the support structure to match the adjusted orientation of the male die punch. The female die is also quickly and easily removable from the tool to facilitate replacement with dies having different configurations of die openings.

The punching tool of this invention is also easy to use in installations where the gutter is already hung.

The swaging tool of this invention is insertable into the mouthpiece or gutter drop to swage-lock the gutter drop to the gutter's bottom wall. For this purpose, the swaging tool comprises a simple, compact mechanism which is operable by a single 90° turn of an operating shaft to produce a plurality of spaced apart, outwardly protruding swaged formations in the gutter drop on the underside of the rain gutter, whereby the gutter drop is secured in place by gripping the gutter's bottom wall between the gutter drop's flange or rim and the swaged formations.

Various swaging and other tools have been proposed in past for assembling one part with another. Examples are described in U.S. Pat. Nos. 568,574, 1,514,099, 1,639,252, 2,582,746, 2,830,375, 2,926,026, 3,345,730 and 3,542,076. None of these tools, however, is suitable for swage-locking a gutter drop to a rain gutter.

With the foregoing in mind, the primary aim and purpose of this invention is to provide a novel apparatus and method for punching a downspout hole in a rain gutter and for swage-locking a gutter drop or mouthpiece to the gutter after it is inserted into the downspout hole.

A more specific object of this invention is to provide a novel tool for punching downspout holes in rain gutters.

Another more specific object of this invention is to provide a novel swaging tool for swage-locking a mouthpiece or gutter drop to a rain gutter.

Still another important object of this invention is to provide novel punching and swaging hand tools which are easy to use and which are of simplified, rugged construction.

Still another object of this invention is to provide a novel hand-operated tool for making both horizontal and vertical, precisely oriented cuts in rain gutters for receiving a mouthpiece or gutter drop.

Yet another object of this invention is to provide a new and improved swage-locked connection of a gutter drop to a rain gutter.

Further objects of this invention will appear as the description proceeds in connection with the below-described drawings and the appended claims.

DETAILED DESCRIPTION

Figures 1, 5:
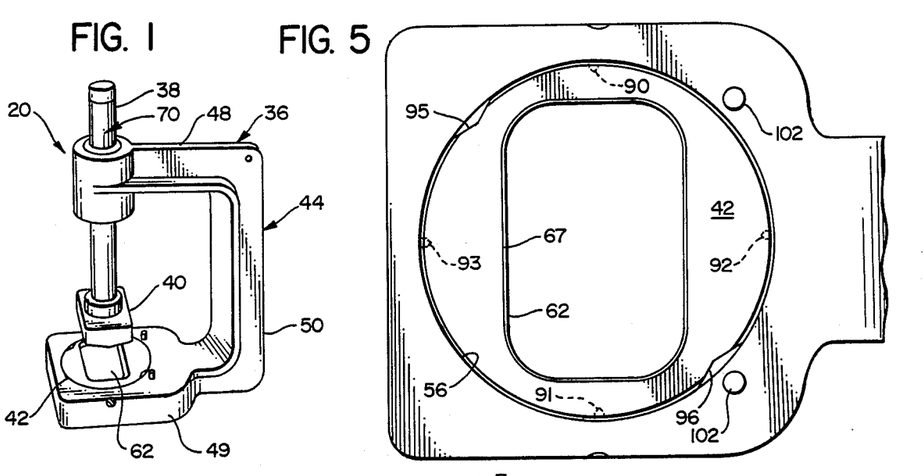
FIG. 1 is a perspective view of a punch tool incorporating the principles of this invention.
FIG. 5 is a section taken substantially along lines 5—5 of FIG. 2.
Figure 2:
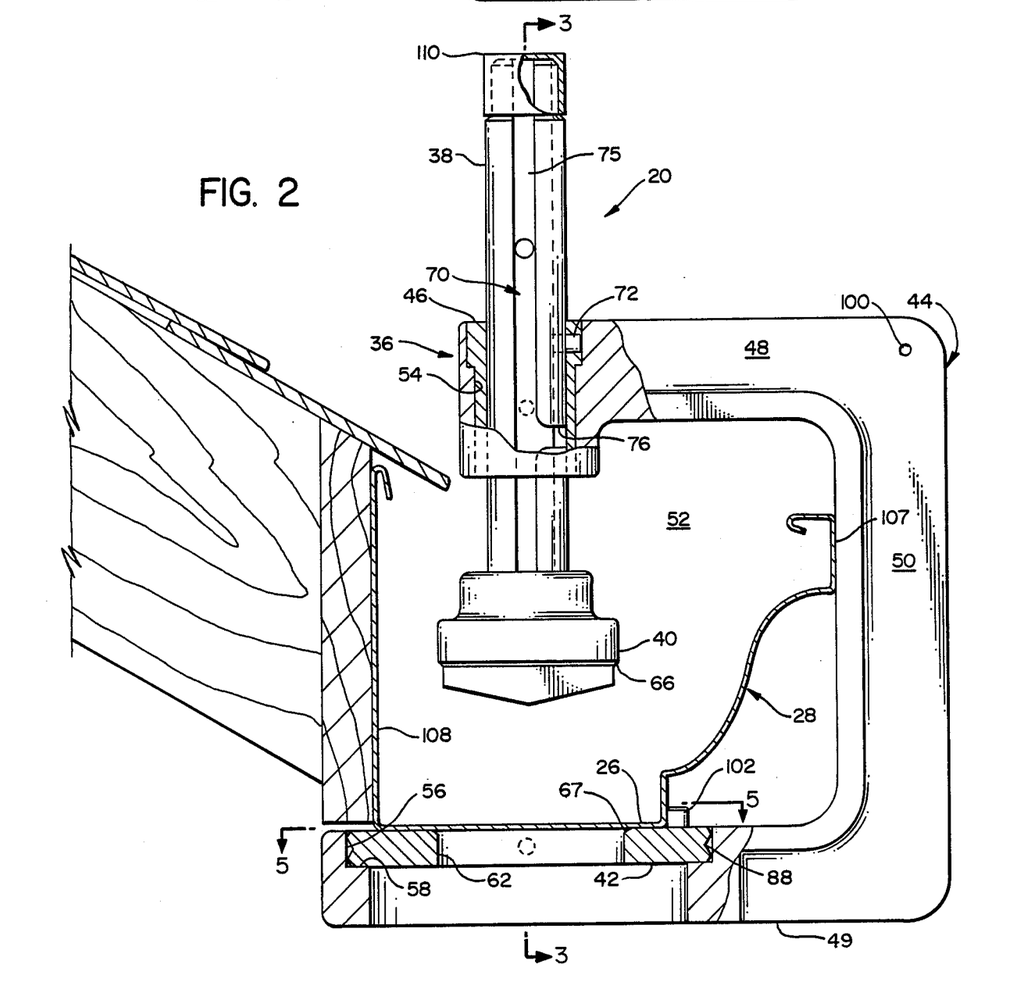
FIG. 2 is a partially sectioned side elevation of the punch tool in its operating position on a rain gutter.
Figures 3, 4, 6, 7:
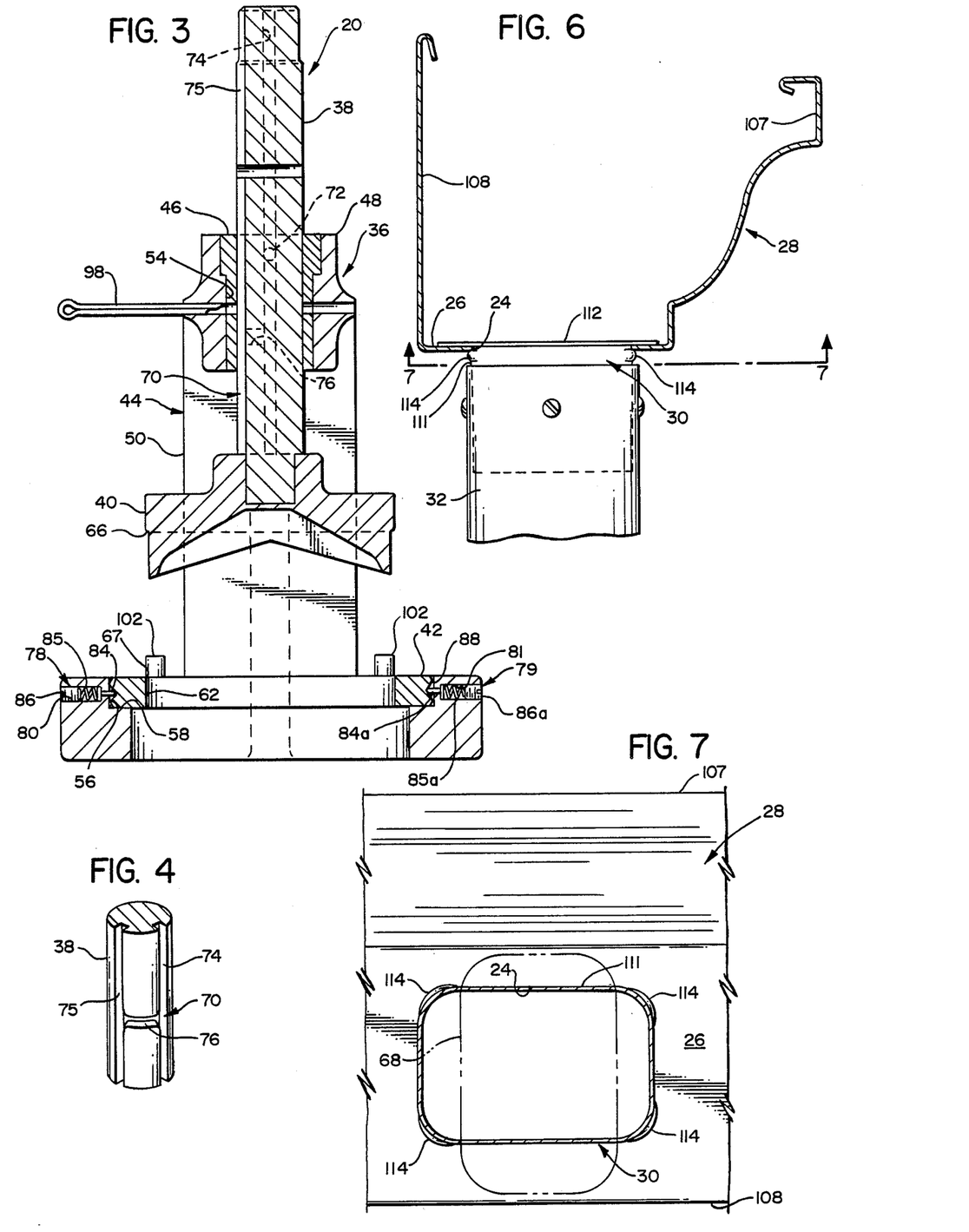
FIG. 3 is a section taken substantially along lines 3—3 of FIG. 2.
FIG. 4 is a fragmentary perspective view of the punch tool's guide shown in FIGS. 1-3.
FIG. 6 is a transverse sectioned view of the completed gutter and gutter drop installation.
FIG. 7 is a section taken substantially along lines 7—7 of FIG. 6.

Referring to the drawings, the punching tool incorporating the principles of this invention is generally indicated at 20 in FIGS. 1-3, and the swaging tool incorporating additional principles of this invention is generally indicated at 21 in FIGS. 9-15. Both of the tools 20, 21 are portable, hand-operated, hand-carried tools and require no electrical or mechanical power for operation.

As will be described in detail shortly, punching tool 20 is used to punch a downspout hole or aperture 24 in the bottom wall 26 of a rain gutter 28. After a gutter drop or mouthpiece 30 is inserted into the downspout hole 24, the swaging tool 21 is inserted into the gutter drop and is operated to swage-lock the gutter drop to the rain gutter's bottom wall 26 (see FIGS. 6-8). Thereafter, a downspout 32 is positioned to receive the depending portion of the gutter drop 30 on the underside of rain gutter 28. To complete the installation, downspout 32 is fixed to the gutter drop 30 by screws or other suitable fasteners.

Referring to FIGS. 1-3, the punching tool 20 mainly comprises a support structure 36, a guide shaft 38, a male die punch 40 and a female die 42. Support structure 36 comprises a rigid, preferably one-piece support housing 44 and a guide bushing 46 for journalling shaft 38. Support housing 44 may be formed from any suitable material which is preferably lightweight such as aluminum. Punch 40 and female die 42 are preferably formed from tool steel. Punch 40 may be formed from casting, and female die 42 may be hardened by suitable heat treatment.

Still referring to FIGS. 1-3, support housing 44 is formed with a pair of upper and lower, parallel spaced apart arm portions 48 and 49 and a straight intermediate portion 50 extending between an integrally interconnecting arm portions 48, 49. In its illustrated upright position, portions 48-50 provide housing 44 with a generally C-shaped configuration. In the illustrated position, arm portion 48 overlies and extends coextensively with a portion of arm portion 49. Arm portions 48, 49 extend perpendicularly from intermediate portion 50 such that portions 48-50 define a mouth 52 for transversely receiving rain gutter 28.

Guide bushing 46 is coaxially received with a press fit in a stepped, open-ended bore 54 which is formed through the free end of arm portion 48. Guide shaft 38 is slidably and rotatably coaxially received in guide bushing 54. Guide shaft 38 is rotatable about and axially displaceable in opposite directions along the longitudinal axis of bushing 46.

Still referring to FIGS. 1-3, the support housing's lower arm or base portion 49 is formed with a through bore 56 along an axis axially aligning with the longitudinal axis of bushing 46 and hence with the rotational axis of guide shaft 38. Bore 56 is stepped as best shown in FIGS. 3 and 4 to form a flat, upwardly facing annular shoulder 58. The female die 42 is in the form of a flat-sided block having an outer, uniformly diametered periphery. Female die 42 is coaxially and interfittingly received in the upper enlarged diametered portion of bore 56 and seats on shoulder 58 such that its upper flat face lies flush with the upper flat face of the support housing's base portion 49.

A die aperture 62 of pre-selected configuration is coaxially formed through die 42 such that the longitudinal axis of the die aperture 62 is coaxial with the axis of bore 56 and axially aligned with the longitudinal axis of bushing 46 and hence with the longitudinal axis of guide shaft 38.

The male punch 40 is press fitted onto or otherwise securely fixed to the lower end of guide shaft 38 for travel between arm portion 48 and the female die 42 on base portion 49. The longitudinal axis of guide shaft 38 intersects the center of punch 40. In the illustrated embodiment, punch 40 and die aperture 62 are provided with mating rectangular configurations to provide the downspout hole 24 with a corresponding rectangular configuration for receiving mouthpieces or gutter drops having a rectangular cross section.

Punch 40 is axially displaceable with guide shaft 38 between a retracted position where punch 40 is raised above female die 42 and a fully projected lowered position where at least the cutting or punching edge of punch 40 lies beyond die aperture 62 on the underside of the female die. In its punch or driving stroke, punch 40 is axially advanced from its retracted position and passes through die aperture 62 so that it acts with female die 42 to punch the downspout hole 24 in the rain gutter's bottom wall 26.

Punch 40 and die aperture 62 may be of any suitable form for punching the downspout hole 24 in the rain gutter bottom wall 26. Alternatively, punch 40 and female die 42 may be provided with mating, beveled, workpiece shearing shoulders 66 and 67, respectively. Shoulder 66, which is formed on punch 40 intermediate its upper and lower ends, extends completely around the periphery of the punch. The female die's shoulder 67 is located at the upper edge of die aperture 62 and extends completely around the die aperture. Shoulders 66 and 67 are sloped at a common acute angle with a horizontal plane normally intersecting the longitudinal axes of die aperture 62 and the guide shaft assembly and punch assembly 38, 40. The acute angle that shoulders 66, 67 make with the foregoing horizontal plane is preferably in the range of 10° to 12° whereby punch 40 cooperates with die 42 to cut the rain gutter bottom 26 with a shearing action. Preferably, the angle which shoulders 66, 67 make with the horizontal plane mentioned above is selected at a value which does not exceed approximately 12°. Acute angles greater than 12° tend to undesirably cause punch 40 to perform all or most of the cutting action by itself. For some installations, it is desirable to orient the downspout hole 24 with its long dimension extending longitudinally of gutter 28 as shown in FIGS. 1–3. In other installations, however, it is desirable to orient hole 24 with its long dimension or long axis extending cross wise of the rain gutter and hence normal to the gutter's longitudinal axis as shown by the phantom lines 68 in FIG. 7.

Both punch 40 and female die 42 are adjustable to permit the punching of hole 24 in either of its 90° spaced apart orientations shown in FIG. 6. For this purpose, the guide shaft and punch assembly 38, 40 is selectively rotatable between punching positions which are angularly spaced apart by 90°, and female die 42 is similarly rotatable between corresponding 90° spaced apart positions to match the orientation of punch 40.

To provide the rotation of the guide shaft and punch assembly from one of its punching positions to the other, guide shaft 38 is formed with an exterior groove or slot formation 70 (see FIG. 4) which coacts with a dowell pin 72 (see FIGS. 2 and 3). The slot or groove formation 70 is formed with a pair of longitudinally extending outwardly opening grooves 74 and 75 and a circumferentially extending, outwardly opening groove 76. Grooves 74 and 75 are angularly spaced apart by 90°, and groove 76 extends circumferentially between grooves 74 and 75.

Pin 72 is fixed to bushing 46 and extends radially inwardly to ride in the groove formation 72 to thus guide and direct the rotational and axial movement of guide shaft 38 relative to support housing 44. The longitudinally extending grooves 74 and 75 provide for the longitudinal punching strokes of the guide shaft and punch assembly 38, 40 in its angularly spaced apart punching positions. The circumferential extending groove 76 provides for the rotation of the guide shaft and punch assembly between the assembly's angularly spaced apart positions. Engagement of pin 72 in either of the longitudinal grooves 74, 75 locks the guide shaft and punch assembly 38, 40 against rotation from the selected punching position.

In order to rotate the guide shaft 38 and punch assembly 38, 40 from its illustrated punching position to its alternate punching position, the guide shaft and punch assembly is axially displaced to a position where the cross groove 76 aligns with pin 72. The shaft and punch assembly 38, 40 is then rotated in a direction causing pin 72 to enter and ride in a cross groove 76. Rotation is continued until pin 72 leaves groove 76 and enters the longitudinal groove 75, and the shaft and punch assembly 38, 40 is then axially displaced causing pin 72 to ride in groove 75 to a position where it is out of registry with cross groove 76, thus locking the shaft and punch assembly against rotation in the alternate punching position where punch 40 is oriented to punch hole 24 with the orientation shown by the phantom lines 68 in FIG. 7.

From the foregoing description, it will be appreciated that grooves 74 and 75 cooperate with pin 72 to accurately locate punch 40 in each of its angularly spaced apart punching positions. Furthermore, grooves 74 and 75 coact with pin 72 to prevent inadvertent rotation of punch 40 from each of its angularly spaced apart punching positions during a punching operation. Thus, the coacting groove and pin construction described above provides a simple, quick and easy orientation adjustment of punch 40 for accurately punching the downspout hole in either one of its two positions shown in FIG. 7.

As shown in FIGS. 2 and 6, the female die 42 is releasably retained in place in bore 56 by a pair of spring biased retainer assemblies 78 and 79. Retainer assemblies 78, 79 are mounted in cylindrically smooth axially aligned bores 80 and 81, respectively. Bores 80 and 81 are formed through the base or arm portion 49 along axially aligned axes extending radially of the axis of bore 56 such that each of the retainer-receiving bores 80, 81 opens at its inner end into the enlarged section of bore 56. Bores 80, 81 are angularly spaced apart by 180° and are disposed on opposite sides of the female die 42 as viewed from FIG. 2.

Retainer assembly 78 comprises a suitable retainer member such as a pin or plunger 84, a biasing spring 85 and a set screw 86. Plunger 84 is coaxially, slidably received in the inner end of bore 80 and protrudes inwardly beyond bore 80 into the enlarged bore section of bore 56. Set screw 86 is threaded into the outer end of bore 80, and spring 85 is compressed between set screw 86 and plunger 84 to bias plunger inwardly radially into the enlarged section of bore 56.

Retainer assembly 79 is of the same construction as retainer assembly 78. Accordingly, like reference numerals have been applied to designate like parts of the two retainer assemblies, except that the reference numerals used for retainer assembly 79 have been suffixed by letter "a" to distinguish them from the reference numerals used for retainer assembly 78.

An endless circumferentially extend groove 88 receives plungers 84, 84a and is formed in female die 42 completely around its outer periphery. To match the angular orientation of plunger 40, female die 42 is also formed with two pairs of shallow bores or recesses 90, 91, 92 and 93. Bores 90–93 extend radially of the longitudinal axis of die aperture 62, are equiangularly spaced apart and opened at their outer ends into the female die's circumferential groove 88.

To punch a downspout hole with its long dimension extending longitudinally of rain gutter 28, plungers 84 and 84a will be received in bores 90 and 91, respectively, to thereby releasably lock female die 42 to the support housing's base portion 49. When punch 40 is in its alternate punching position for punching a downspout hole shown by the phantom lines 68 in FIG. 7 (where the long dimension of the downspout hole 24 extends crosswise of gutter 28) female die 42 is angularly positioned at a location where plungers 84 and 84a are received in bores 92 and 93, respectively, thus releasably locking female die 42 in its alternate punch position.

In each of the two punching positions of female die 42, plungers 84 and 84a are yieldably biased by their associated springs 85 and 85a into the appropriate ones of bores 90–93. Accordingly, female die 42 will be releasably locked in each of its two punching positions where it matches the orientation of punch 40. Bores 90–93 serve to precisely orient female die 42 to ensure that it matches the orientation of punch 40 for making an interference-free, smooth, clean cut in the rain gutter's bottom wall 26.

To shift female die 42 from one of its releasably locked punching positions to the other, die 42 is formed with a pair of equiangularly spaced apart circumferentially outwardly opening notches 95, 96. Notches 95, 96 define a gap with the cylindrical wall of bore 56. Where it is desired to shift the female die 42 from the punching position shown in FIG. 4 to the alternate punching position, a screwdriver or other similar tool is inserted into one of the notches 95, 96 to lift die 42 out of bore 56, causing plungers 84 and 84a to be cammed out of bores 90 and 91 and to thus be forced outwardly against the bias of their respective springs 85, 85a. Female die 42 is then rotated slightly in either direction and then snapped back into bore 56, allowing plungers 84 and 84a to seat in the female die's circumferential groove 88. Die 42 is then rotated in the appropriate direction to align bores 92 and 93 with plungers 84 and 84a where springs 85 and 85a bias the plungers into bores 92 and 93, thereby releasably locking female die 42 in its alternate punching position. To move die 42 back to its original punching position, the same procedure described above is followed.

From the foregoing description, it will be appreciated that female die 42 is removably mounted in the base portion 49 of support housing 44 to thus facilitate the substitution of the female die having a die aperture of some different configuration such as an oval or circular configuration where it is desired to use a gutter drop having an oval or circular cross sectional configuration. The guide shaft and punch assembly 38, 40 is also removably mounted on support housing 44 simply by axially drawing it through bore 56 to separate it from the support housing. For this purpose, the longitudinally extending guide shaft grooves 74, 75 are open at their upper ends. Thus, the guide shaft and punch assembly may be replaced with one having a differently configured punch to facilitate the punching of other downspout hole configurations.

As best shown in FIG. 3, the punching tool 20 may also be equipped with a safety cotter pin 98 which extends through aligned, radially extending bores in the support housing's arm portion 48, bushing 46 and shaft 38 to releasably lock the guide shaft and punch assembly 38, 40 in its raised, retracted position. To release the guide shaft and punch assembly 38, 40 for use in a punching operation, cotter pin 98 is simply removed. A keeper hole 100 (see FIG. 2), which is formed in support housing 44, may be used to store cotter pin 98 while the punching tool is in use.

In order to properly orient the punching tool 20 with respect to the rain gutter 28, support housing 44 is provided with locating stop pins 102. Pins 102 are fixed to and extend upwardly from the support housing's base portion 49.

To perform a punching operation, gutter 28 is positioned on the top of the support housing's base portion 49 at a location where the gutter's front wall seats against housing portion 50 or pins 102. In this position, the longitudinal axis of the guide shaft and punch assembly 38, 40 intersects the rain gutter's bottom wall 26 midway between the rain gutter's front and back walls 107 and 108. Female die 42 is seated against the underside of the rain gutter's bottom wall 26 and punch 40 overlies the rain gutter's bottom wall as shown in FIG. 2. After cotter pin 98 has been removed, the upper end of guide shaft 38 is tapped with a hammer or other similar tool while holding the support housing's base portion in the palm of the worker's other hand, thus driving punch 40 into the rain gutter's bottom wall such that it coacts with the female die 42 to punch the downspout hole 24 in the rain gutter's bottom wall 26. Advantageously, a cap 110 may be mounted on the upper end of guide shaft 38 to protect guide shaft 38 from damage.

After the downspout hole is punched, the guide shaft and punch assembly 38, 40 is raised to a retracted position where it clears the rain gutter's front wall, thus facilitating the removal of the punch tool from the rain gutter. It will be appreciated that the punching operation described above may be accomplished in situ on a rain gutter that is already hung from a building structure. Accordingly, repair work may be done to install one or more additional downspouts on old rain gutters which are already mounted in place on the building structure.

After the downspout hole 24 has been punched in the rain gutter, the gutter drop or mouthpiece 30 is inserted into the punched hole 24 and is then swage-locked to the rain gutter by using swaging tool 21. In the illustrated embodiment, the gutter drop 30 has a conventional rectangular cross section and is formed by a rectangular conduit 111 which terminates at one end in a rim or flange 112. Conduit 111 is interfittingly received in the punched downspout hole 24 at a position where flange 112 seats against the upwardly facing surface of the rain gutter's bottom wall 26 as shown, for example, in FIG. 2. Swaging tool 21 is operated to produce four outwardly produced swaged formations 114 (see FIGS. 6 and 7), one at each corner of the conduit 111 on the underside of the rain gutter's bottom wall 26 such that the rain gutter's bottom wall is gripped or engaged by flange 112 on its top side and by swaged formations 114 on its underside, thus fixing the gutter drop 30 to the rain gutter without the use of separate fasteners of any kind.

Referring now to FIGS. 8–11, swaging tool 21 comprises a two-part housing assembly or structure 120, a swaging shaft 122, four swaging dies 124, 125, 126 and 127, and a swaging push bar assembly 128. Shaft 122, swaging dies 124–127 and push bar assembly 128 are all mounted on housing assembly 120 in a manner to be described in detail shortly. Push bar assembly 128 provides a motion transmitting connection between shaft 122 and swaging dies 124–127 for actuating the dies to form the swaged formations 114.

Housing assembly 120 comprises an upper one-piece housing 130 and a lower one-piece housing 132 which is detachably fixed to the bottom flat face of housing 130 by cap screws 133 or other suitable fasteners. The upper and lower housings 130, 132 may be formed from a suitable lightweight material such as aluminum.

Figure 11:
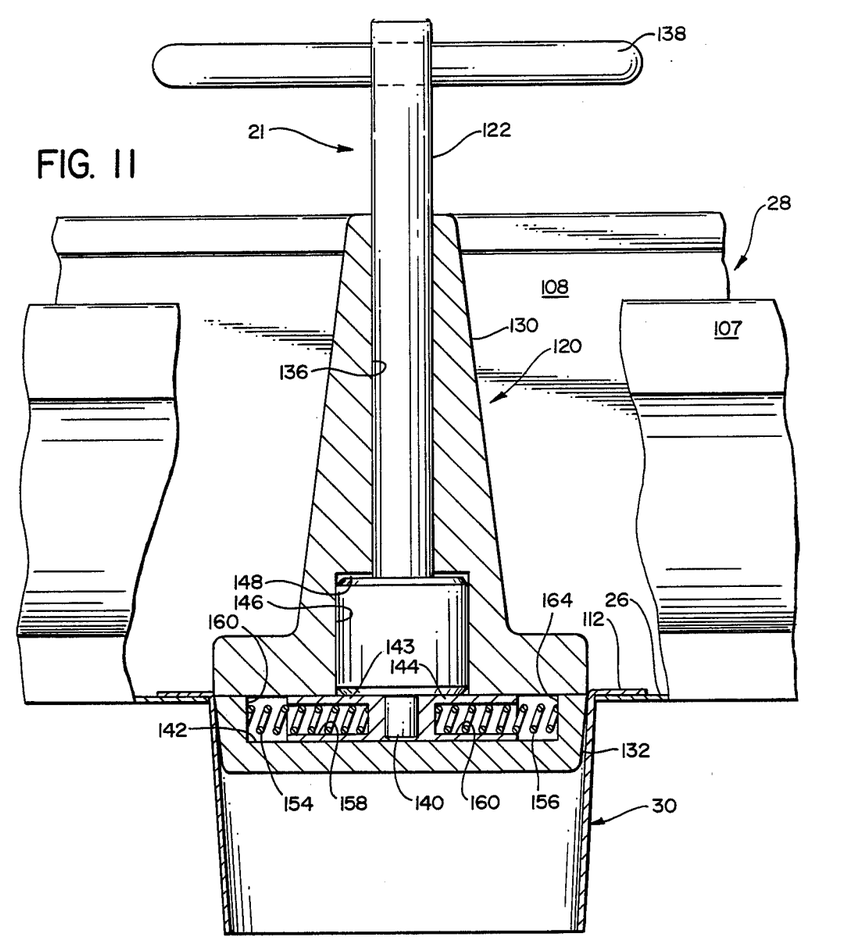
FIG. 11 is a section taken substantially along lines 11—11 of FIG. 10.

As shown in FIG. 11, a stepped bore 136 is formed through housing 130 along the housing's central axis. Shaft 122 is coaxially and rotatably received in bore 136 and extends at both ends beyond bore 136. The upper or outer end of shaft 122 is provided with a handle 138.

The other end of shaft 122 terminates a flat-sided, acutator lug 140. Actuator lug 140 is centrally received in a flat-bottomed recess 142 which is formed in the lower housing 132. The push bar assembly 128 comprises a pair of flat-sided push bar members 143 and 144 which are slidably seated in recess 142. The arrangement is such that the shaft's actuator portion 140 lies between push bars 143, 144 and is engageable with the push bars to slidably push them apart.

As shown, shaft 122 has a diametrically enlarged intermediate section 146. Bore 136 is stepped to form an annular shoulder 146. The enlarged shaft section 146 is axially trapped in the bore's enlarged section between shoulder 148 at one end and push bars 143, 144 at the other end to confine shaft 122 against axial movement.

Recess 142 is formed with straight parallel sides 150 and 151 which confine the sliding movement of push bars 143, 144 to a path extending radially of the rotational axis of shaft 122. A spring 154 yieldably biases push bar 143 toward actuator lug 140. Another spring 156 yieldably biases push bar 144 toward actuator lug 140.

As shown in FIG. 11, push bar 143 is formed with a socket 158 for receiving spring 154, and push bar 144 is likewise formed with a socket 160 for receiving spring 156. Spring 158 is compressed between the bottom wall of socket 158 and wall 162 of housing 132. Spring 160 is similarly compressed between the bottom wall of socket 160 and wall 164 of housing 132. The opposing biasing forces exerted by springs 154 and 156 are aligned and normally intersect the rotational axis of shaft 122. By turning shaft 122 in either direction, actuator lug 140 engages push bars 143, 144 to force the push bars radially apart. The flat bottom of housing 130 and the diametrically enlarged section of shaft 122 cover recess 142 to retain push bars 143, 144 in their operative positions within recess 142.

Figure 8:
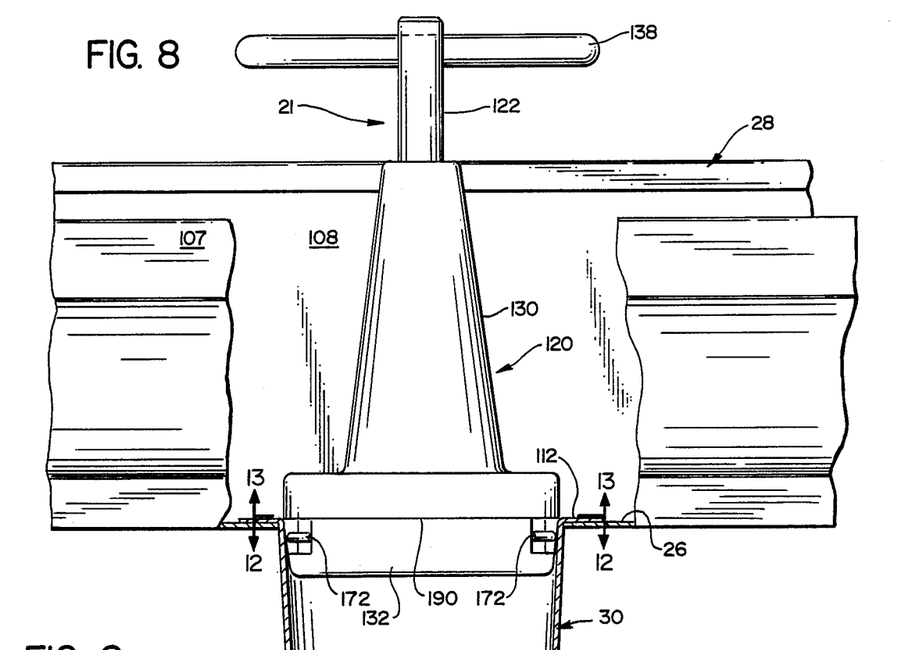
FIG. 8 is a front elevation of the swaging tool incorporating the principles of this invention and showing the swaging tool in position on the gutter and gutter drop assembly.
Figure 9:
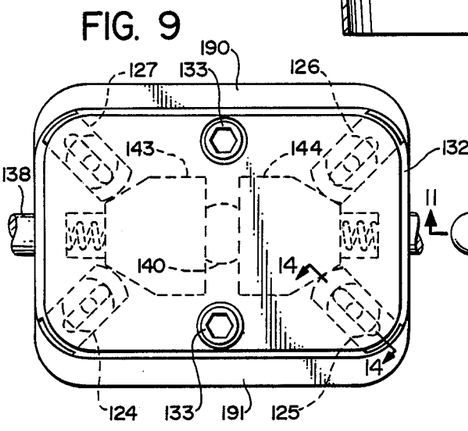
FIG. 9 is a bottom plan view of the swaging tool shown in FIG. 8.
Figure 10:
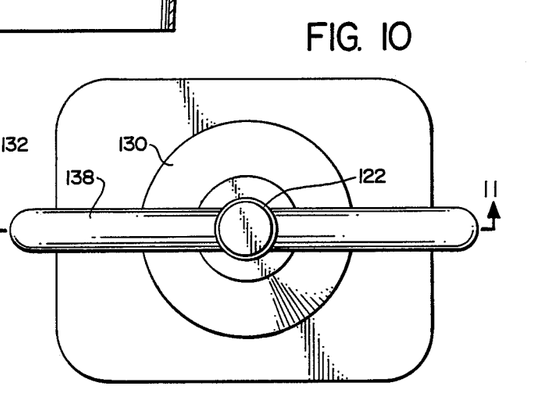
FIG. 10 is a top plan view of the swaging tool shown in FIG. 8.

As shown in FIGS. 8 and 11, housing 132 is slidably receivable in gutter drop 30 and has an outer periphery corresponding to the cross sectional configuration of gutter drop 30. Housing 132 is gradually tapered in the direction in which it is insertable into the flanged end of gutter drop 30 to provide for the easy entrance of housing 132 into the gutter drop preparatory to swaging. The upper end of housing 132 is receivable in the upper, flanged end portion of gutter drop 30 with a close, mating fit. As shown, the corners of housing 132 are rounded to mate with the slightly rounded corners of gutter drop 30.

Figure 12:
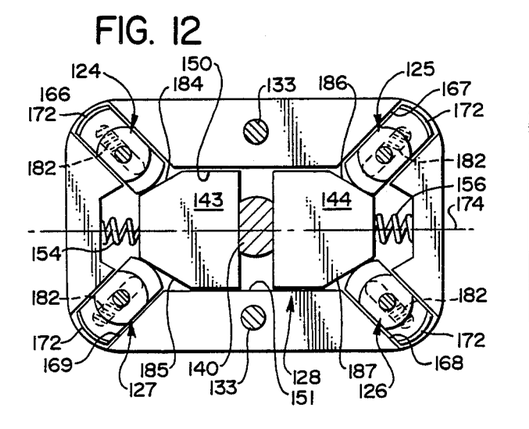
FIG. 12 is a section taken substantially along lines 12—12 of FIG. 8.

As best shown in FIG. 12, housing 132 is formed with four, straight-sided, flat-bottomed slots 166, 167, 168 and 169 which open upwardly toward housing 130. Slots 166-169 are located one at each corner of housing 132 for slidably and interfittingly receiving swaging dies 124-127, respectively. Each of the diereceiving slots 166-169 opens at its associated exterior corner of housing 132 at the upper edge of housing 132. The inner ends of slots 166-169 open into recess 142. Housing 130 extends over slots 166-169 to cover the slots.

Still referring to FIG. 12, each of the swaging dies 124-127 is straight-sided and has an outer arcuate edge 172 for engaging and swaging gutter drop 30 from the interior thereof to produce the outwardly protruding swaged formation 114. Dies 124-127 slidably extend into slots 166-169 for rectilinear sliding movement along straight paths between retracted and outwardly extending or swaging positions. The straight slide paths or swaging dies 166-167 lie in a common plane which normally intersects the rotational axis of shaft 122.

The longitudinal axes of slots 166-169 and hence the longitudinal slide axes of swaging dies 124-127 each intersect a vertical plane 174 (FIG. 13) at an angle of 45°. Plane 174 contains the rotational axis of shaft 122 and medially intersects housing 132 in parallel relation to the long dimension of housing 132. Slots 166-169 and swaging dies 124-127 are symmetrically arranged about plane 174. By this arrangement, each of the swaging dies 124-127 is longitudinally slidable in its associated slot (166-169) along a path that normally intersects a line extending tangentially of the adjacent rounded housing corner and, hence, a line extending tangentially of the adjacent gutter drop corner when housing 132 is positioned in the gutter drop.

Figure 13:
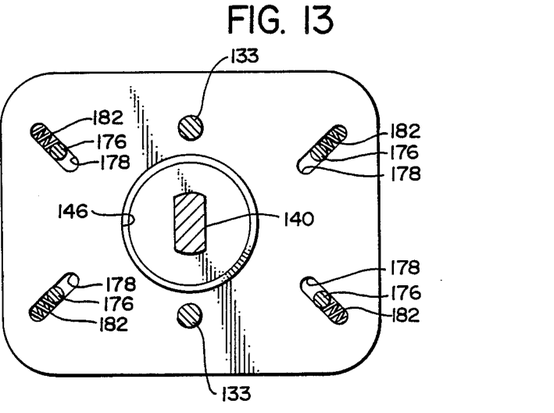
FIG. 13 is a section taken substantially along lines 13—13 of FIG. 8.
Figure 14:
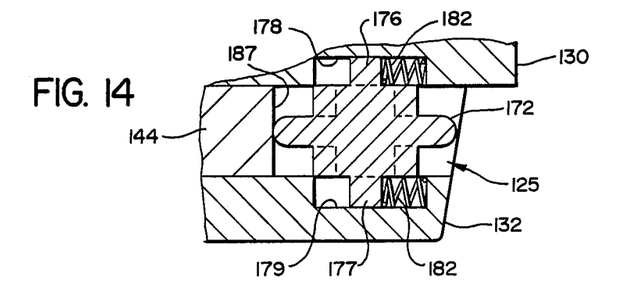
FIG. 14 is a fragmentary section taken along lines 14—14 of FIG. 9.

Referring to FIGS. 12-14, each of the swaging dies 124-127 is provided with a pair of guide pins 176, 177 extending in opposite directions away from the swaging die's oppositely facing flat faces. The pins 176, 177 for each swaging die extends into straight-sided slots 178 and 179, respectively, there being one pair of such pin-receiving slots for each swaging die. The slots 178, 179 for each swaging die are coextensively formed in housings 130, 132, respectively.

Each of the swaging dies 124-127 is provided with a separate spring 182 which is compressed between the swaging die's pin 176 and the outer end of the die's associated slot 178. By this construction, each of the swaging dies 124-127 is individually yieldably biased to its withdrawn or retracted position where its forward swaging edge lies flush with or slightly within the outer end of its associated housing slot (166-169). In their retracted positions, swaging dies therefore do not protrude beyond housing 132.

As shown in FIG. 12, push bar 143 is formed at its nose end with a pair of straight, angulated edges 184 and 185 which transversely intersect the longitudinal axes of swaging dies 124 and 127, respectively. In their retracted positions, the inner ends of swaging dies 124, 127 are spring biased into engagement with edges 184 and 185, respectively.

Still referring to FIG. 12, push bar 144 is also formed at its nose end with a pair of straight, angulated edges 186 and 187 which transversely intersect the longitudinal axes of swaging dies 125 and 126, respectively. In their retracted positions, the inner ends of swaging dies 125, 126 are spring biased into engagement with edges 186 and 187, respectively.

As shown in FIG. 8, housing 132 extends at both sides beyond housing 132 to form a pair of downwardly facing flat locating shoulders 190 and 191.

To swage formations 114, gutter drop 30 is first inserted into the downspout hole 24 to a position where flange 112 seats against the upwardly facing side of the gutter's bottom wall 26. Swaging tool 21 is then partially inserted into the flanged end of gutter drop 30 to a position where housing 132 is located within the upper flanged end portion of gutter drop 30 and where shoulders 190, 191 seat against the gutter drop's flange 112. Shoulders 190, 191 serve to properly position swaging dies 124-127 at locations where they are at a level immediately below the gutter's bottom wall 26. Shaft 122 is then turned 90° in either direction.

Actuator lug 140 will therefore be rotated 90° from its illustrated position to urge push bars 143, 144 radially apart against the bias of their springs 154, 156. Push bar 143 will therefore be forced outwardly between swaging dies 124, 127, thus urging swaging dies 124, 127 outwardly to their extended positions where they protrude beyond housing 132 to engage adjacent corners of gutter drop 30. At the same time, push bar 144 will also be forced outwardly between dies 125, 126, thus urging dies 125, 126 outwardly to their extended positions where they protrude beyond housing 132 and engage the adjacent corners of gutter drop 30 and to thus form formations 114 in the adjacent corners of the gutter drop. As a result, gutter drop 30 will be swaged-locked to gutter 28 by the engagement of formations 114 on the underside of the gutter's bottom wall 26 and by the engagement of the gutter drop's flange 112 on the upper side of bottom wall 26. After formations 114 are swaged, shaft 122 is rotated back to its original position where the small dimension of actuator lug 140 lies crosswise between push bars 143, 144, thus allowing springs 154, 156 to bias push bars 143, 144 back to their retracted positions and allowing springs 182 to bias swaging dies 124-127 back to their retracted positions. Swaging tool 21 is then removed from the swaged-locked gutter drop.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A portable, hand-carried swaging tool for swaging outwardly protruding formations in a flanged gutter drop to secure the gutter drop to a rain gutter, comprising
   a housing structure having a housing portion which is configured and dimensioned for reception in the gutter drop after the gutter drop is inserted into a hole in the bottom wall of the rain gutter, a plurality of swaging dies mounted on said housing portion for movement between retracted and swaging positions, and means for selectively shifting said swaging dies from their retracted positions to their swaging positions while said housing portion is received in said gutter drop to swage said formations on the underside of said bottom wall and to thereby secure the gutter drop to said bottom wall by sandwiching said bottom wall between said formations and the flange of said gutter drop.

2. The portable, hand-carried swaging tool defined in claim 1 wherein said gutter drop has a rectangular configuration in cross section, and wherein said swaging dies are positioned to swage said formations at least at a plurality of the corners of said gutter drop.

3. The portable, hand-carried swaging tool defined in claim 1 wherein said housing structure is provided with at least one locating portion which is seatable against the flange of said gutter drop when said housing portion is received in the gutter drop to locate said swaging dies at positions lying immediately below said bottom wall.

4. The portable, hand-carried swaging tool defined in claim 1 wherein said means for selectively shifting said swaging dies to their swaging positions comprises a shaft rotatably mounted on said housing structure and motion-transmitting means disposed between said shaft and said swaging dies, said motion-transmitting means being displaced by rotation of said shaft to shift said swaging dies to their swaging positions.

5. The portable, hand-carried swaging tool defined in claim 4 wherein said swaging dies and motion-transmitting means are slidably mounted on said housing portion.

6. The portable, hand-carried swaging tool defined in any one of the preceding claims 3-5, wherein said gutter drop has a rectangular configuration in cross section, there being four of said swaging dies positioned to swage said formations one at each corner of said gutter drop.

7. A portable, hand-carried swaging tool for swaging outwardly protruding formations from a flanged gutter drop to secure the gutter drop to a rain gutter, comprising:
   a housing structure having a housing portion which is configured and dimensioned for reception in the gutter drop after the gutter drop is inserted into a hole in the bottom wall of the rain gutter, a plurality of swaging dies mounted on said housing portion for movement between retracted and swaging positions, and means for selectively shifting said swaging dies from their retracted positions to their swaging positions while said housing portion is received in said gutter drop to swage said formations on the underside of said bottom wall and to thereby secure the gutter drop to said bottom wall by sandwiching said bottom wall between said formations and the flange of said gutter drop;
   said means for selectively shifting said swaging dies to their swaging positions comprising a shaft rotatably mounted on said housing structure and motion transmitting means disposed between said shaft and said swaging dies, said motion transmitting means being displaced by rotation of said shaft to shift said swaging dies to their swaging positions;
   said swaging dies and motion transmitting means being slidably mounted on said housing portion;
   said swaging dies being confined by said housing portion to sliding movement along a straight path;
   said motion transmitting means comprising first and second members, each of said first and second members being mounted in said housing portion for sliding movement between first and second positions;
   said tool also including spring means which biases said first and second members to their first positions and an acutator positioned on said shaft and so engaging said first and second members as to shift said first and second members against the bias of said spring means to their second positions upon rotation of said shaft;
   first and second ones of said swaging dies being spring biased to retracted positions where they engage said first member, said swaging dies also being displaceable to their swaging positions upon displacement of said first member to its second position; and
   third and fourth ones of said swaging dies being spring biased to retracted positions where they engage said second member, said last-mentioned swaging dies also being displaceable to their swaging positions upon displacement of said second member to its second position.

* * * * *